(12) United States Patent
Pan et al.

(10) Patent No.: US 12,019,739 B2
(45) Date of Patent: Jun. 25, 2024

(54) USER BEHAVIOR RISK ANALYTIC SYSTEM WITH MULTIPLE TIME INTERVALS AND SHARED DATA EXTRACTION

(71) Applicant: International Business Machines Corporation, Armonk, NY (US)

(72) Inventors: Jerry Pan, Roswell, GA (US); Jian Lin, Alphretta, GA (US); Michael Josiah Bolding, Smyrna, GA (US); Dominique J. Paster, Atlanta, GA (US); Peihao Chen, Atlanta, GA (US); Wesley Truett, Cumming, GA (US); Timothy A. Thornburgh, Woodstock, GA (US)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 16/387,416

(22) Filed: Apr. 17, 2019

(65) Prior Publication Data

US 2020/0334498 A1 Oct. 22, 2020

(51) Int. Cl.
*G06F 21/55* (2013.01)
*G06F 17/15* (2006.01)
(Continued)

(52) U.S. Cl.
CPC ............ *G06F 21/552* (2013.01); *G06F 17/15* (2013.01); *G06F 18/2148* (2023.01);
(Continued)

(58) Field of Classification Search
CPC .... G06K 9/6221; G06K 9/6257; G06N 20/00; G06N 5/025; G06F 17/15; G06F 21/552; G06F 2221/2151
See application file for complete search history.

(56) References Cited

U.S. PATENT DOCUMENTS 7,310,590 B1 * 12/2007 Bansal ................ G06F 11/0751
703/22
9,607,144 B1 * 3/2017 Bird .................... H04L 63/1408
(Continued)

OTHER PUBLICATIONS

Haim et al., "Visualizing Insider Threats: An Effective Interface for Security Analytics" (poster), IUI 2017 Companion, Mar. 13-16, 2017, Limassol, Cyprus. Retrieved from <https://dl.acm.org/doi/pdf/10.1145/3030024.3038264> (Year: 2017).*
(Continued)

*Primary Examiner* — Miranda M Huang
*Assistant Examiner* — Yao David Huang
(74) *Attorney, Agent, or Firm* — Van Leeuwen & Van Leeuwen; Anthony M. Pallone

(57) ABSTRACT

An approach is provided that receives event data that correspond to detected activities performed by a user on one of a set of one or more computer systems. The detected activities are performed by the user over a time duration. The approach analyzes the event data using time-based models. Each of the time-based models correspond to a different time interval that is included in the time duration. The analysis results in time-based risk scores pertaining to the user for each of the different time intervals. An action is then performed based on an overall security risk score of the user with the overall security risk score of the user being calculated based on the different time-based risk scores.

16 Claims, 10 Drawing Sheets

(51) Int. Cl.
  *G06F 18/214* (2023.01)
  *G06F 18/2321* (2023.01)
  *G06N 5/025* (2023.01)
  *G06N 20/00* (2019.01)

(52) U.S. Cl.
  CPC ......... *G06F 18/2321* (2023.01); *G06N 5/025* (2013.01); *G06N 20/00* (2019.01); *G06F 2221/2151* (2013.01)

(56) References Cited

U.S. PATENT DOCUMENTS

| | | | | |
|---|---|---|---|---|
| 10,673,880 | B1* | 6/2020 | Pratt | H04L 63/1425 |
| 2006/0282660 | A1* | 12/2006 | Varghese | G07F 7/1083 713/155 |
| 2014/0165207 | A1* | 6/2014 | Engel | H04L 41/069 726/25 |
| 2014/0279641 | A1 | 9/2014 | Singh | |
| 2016/0335550 | A1* | 11/2016 | Achin | G06N 5/02 |
| 2017/0039637 | A1 | 2/2017 | Wandelmer | |
| 2017/0149813 | A1* | 5/2017 | Wright | H04L 63/1416 |
| 2017/0223036 | A1* | 8/2017 | Muddu | G06F 16/285 |
| 2017/0244730 | A1* | 8/2017 | Sancheti | H04L 63/205 |
| 2017/0251013 | A1 | 8/2017 | Kirti | |
| 2017/0286671 | A1* | 10/2017 | Chari | G06F 21/552 |
| 2018/0027006 | A1* | 1/2018 | Zimmermann | H04L 63/0227 726/11 |
| 2018/0288063 | A1* | 10/2018 | Koottayi | H04L 63/1416 |
| 2019/0098037 | A1* | 3/2019 | Shenoy, Jr. | H04L 63/1425 |
| 2020/0065212 | A1* | 2/2020 | Chanda | G06F 11/3452 |
| 2020/0175518 | A1* | 6/2020 | Chu | G06Q 20/4016 |
| 2020/0311487 | A1* | 10/2020 | He | G06N 20/00 |
| 2020/0356676 | A1* | 11/2020 | Gorlamandala | G06F 21/577 |

OTHER PUBLICATIONS

IBM Corp., "IBM Cloud Discovery App for QRadar," Oct. 26, 2017 (Year: 2017).*
"IBM QRadar User Behavior Analytics," International Business Machines Corporation, 2015, 12 pages.
"User Behavior Analytics for QRadar," International Business Machines Corporation, 2014, 10 pages.
Anava et al., "Online Learning for Time Series Prediction," JMLR: Workshop and Conference Proceedings, vol. (2013) 1-13, 13 pages.
Liu et al., "Online ARIMA Algorithms for Time Series Prediction," Proceedings of the Thirtieth AAAI Conference on Artificial Intelligence (AAAI-16), Phoenix, Arizona, Feb. 2016, 7 pages.
"Apache Spark," The Apache Software Foundation, 2018, 5 pages.

* cited by examiner

USER BEHAVIOR RISK ANALYTIC SYSTEM WITH MULTIPLE TIME INTERVALS AND SHARED DATA EXTRACTION

BACKGROUND

In a typical Security Information and Event Management System (SIEM), raw security log events are collected and analyzed for cyber security anomaly detections. Such log events may include system logs, application logs, web server logs, and operational audit logs. IBM QRadar™ is such a SIEM system. A SIEM system typically lacks or is inadequate in assessing security risk imposed by internal users of an organization. The User Behavior Analytic™ Application (UBA) is a software application also offered by IBM as an add-on to the IBM QRadar™. UBA is intended to address some shortcomings found in a traditional SIEM system. A typical data flow in the UBA system monitors real-time events representing users' activity from the organization's network (e.g., servers, desktops, and network/monitoring hardware and/or software equipment). These real-time events are received as raw security information by the UBA system. These events are then analyzed to generate security alerts.

The analytic methods used to generate these security alerts include rule-based pattern matching as well as some Machine Learning (ML) algorithms. However, the ML models directed at time series use statistical models on a fixed time unit (e.g., hourly, etc.) to construct statistical predictions using the past days' data as training inputs (e.g., 30 days of past input, etc.). Once the model is constructed, it will score user activities for a fixed window period for each of the same time unit, until next model is constructed. For example, a model for the hour 10 to 11 am is trained from the past 30 days' data for the same time period, and the resulting statistical model is used to score data for the same time unit of 10 to 11 am when the model is used. As an hourly unit is used, each model for a user has 24 statistic prediction profiles (or mini-models) constructed. While this modeling scheme is useful in providing insights on activity patterns, use of a fixed time interval in traditional systems is problematic as it is rigid, can miss important information contained in the data sets, and contributes to false positives, as users' activity patterns may shift with time more dynamically than the traditional static model anticipated.

SUMMARY

An approach is provided that receives event data that correspond to detected activities performed by a user on one of a set of one or more computer systems. The detected activities are performed by the user over a time duration. The approach analyzes the event data using time-based models. Each of the time-based models correspond to a different time interval that is included in the time duration. The analysis results in time-based risk scores pertaining to the user for each of the different time intervals. An action is then performed based on an overall security risk score of the user with the overall security risk score of the user being calculated based on the different time-based risk scores.

In one embodiment, the event data is input to time-based models with each of the time-based models being machine-learning models. In this embodiment, the analysis is performed using results received from the machine-learning models. In a further embodiment, the time-based machine-learning models are trained using the event data with each of the time-based machine-learning models being trained using a different time interval. In this further embodiment, a set of machine-learning risk scores are correlated based on results received from the time-based machine-learning models. Each set of machine-learning risk scores pertains to a modeled risk of the user corresponding to the respective time intervals of the time-based machine-learning models. The approach then evaluates the correlated set of machine-learning risk scores to calculate the user's security risk score. In yet a further embodiment, the training of the time-based machine-learning models is continuously performed as new event data is received that pertains to the user. In this approach, an empirical distribution approach is to evaluate the correlated set of machine-learning risk scores.

In one embodiment, non-time-based risk scores and rule-based risk scores corresponding to the user are also calculated. In this embodiment, the time-based risk scores, the non-time-based risk scores, and the rule-based risk scores are combined to form the security risk score of the user.

In one embodiment, the event data is stored in a main dataset. Subset datasets are identified with each of the subset datasets pertaining to a different time-based model. The subset datasets are formed from the main dataset. In this embodiment, the analysis is performed by inputting each of the subset datasets to the respective subset datasets' time-based model.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
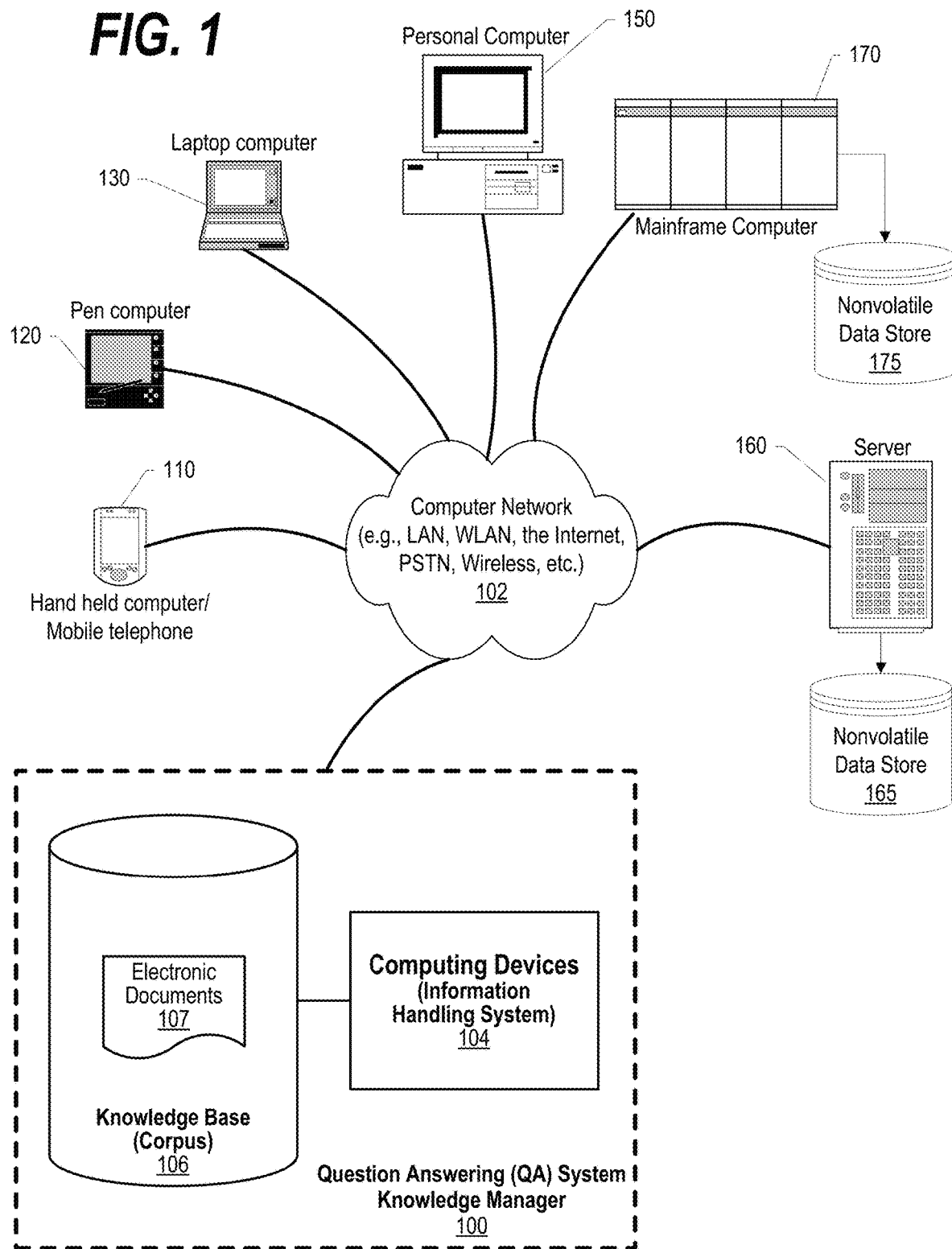
FIG. 1 depicts a network environment that includes a knowledge manager that utilizes a knowledge base.

FIGS. 1-10 describe an approach that provides a user behavior risk analytic system with multiple time intervals. The approach includes a machine learning (ML) time series with multiple time intervals. Instead of having fixed time aspects like traditional systems, the system described by this approach analyzes multiple time aspects of time series data. In one embodiment, the time interval is configurable. More than one interval of the time are used as the base of the model time aspects. In this modeling scheme, the training data for a model are aggregated into labeled time units. When adequate training data is received, a model is built against that labeled time unit. Using the model, incoming data for scoring is aggregated in the same fashion and then scored against model predictions for the same labeled time interval. For example, a Day-of-Week model is designed where the time unit is daily, and a statistic model is built for each day from Monday to Sunday using training data.

When scoring, each past day's data is compared to the model predict for that specific day of week for anomaly detection. Additionally, the traditional model constructs assumed a Gaussian distribution for model computation, while the approach described herein provides for an Empirical distribution. In the described approach, the distribution function is associated with the empirical measure of the input event data for model training. A theoretical distribution, such as a Gaussian distribution, may not fit observations, while the Empirical distribution disclosed herein will match a Gaussian distribution if the model input data does indeed fit Gaussian distribution, but will provide other distributions if the model input data provides for such other distributions.

In the described approach, the different time interval treatments are not exclusive to each other and rather coexist in the system. Their scoring results are also not used independent to each other, rather they are correlated. In this approach, a higher correlation score warrants a more severe anomaly and would trigger more urgent alerts.

In a traditional system, the released ML system uses a static model built from the 30 days of training data. In this embodiment, once built the model is used unchanged for a set period of days (e.g., seven days, etc.). Hence, it uses a forward moving window for model building and for data scoring. This arrangement is inefficient as the model is disregarded and built from scratch when a new model is needed. This also means that the longer a static model is used in traditional systems the more stale and more inaccurate that model becomes. Instead of the static model approach, the approach described herein uses an "online model" approach, where each model, once constructed, is not disregarded but, instead, continuously updated with new data points with scoring being performed when model is deemed stable.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, New York, which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory.

Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
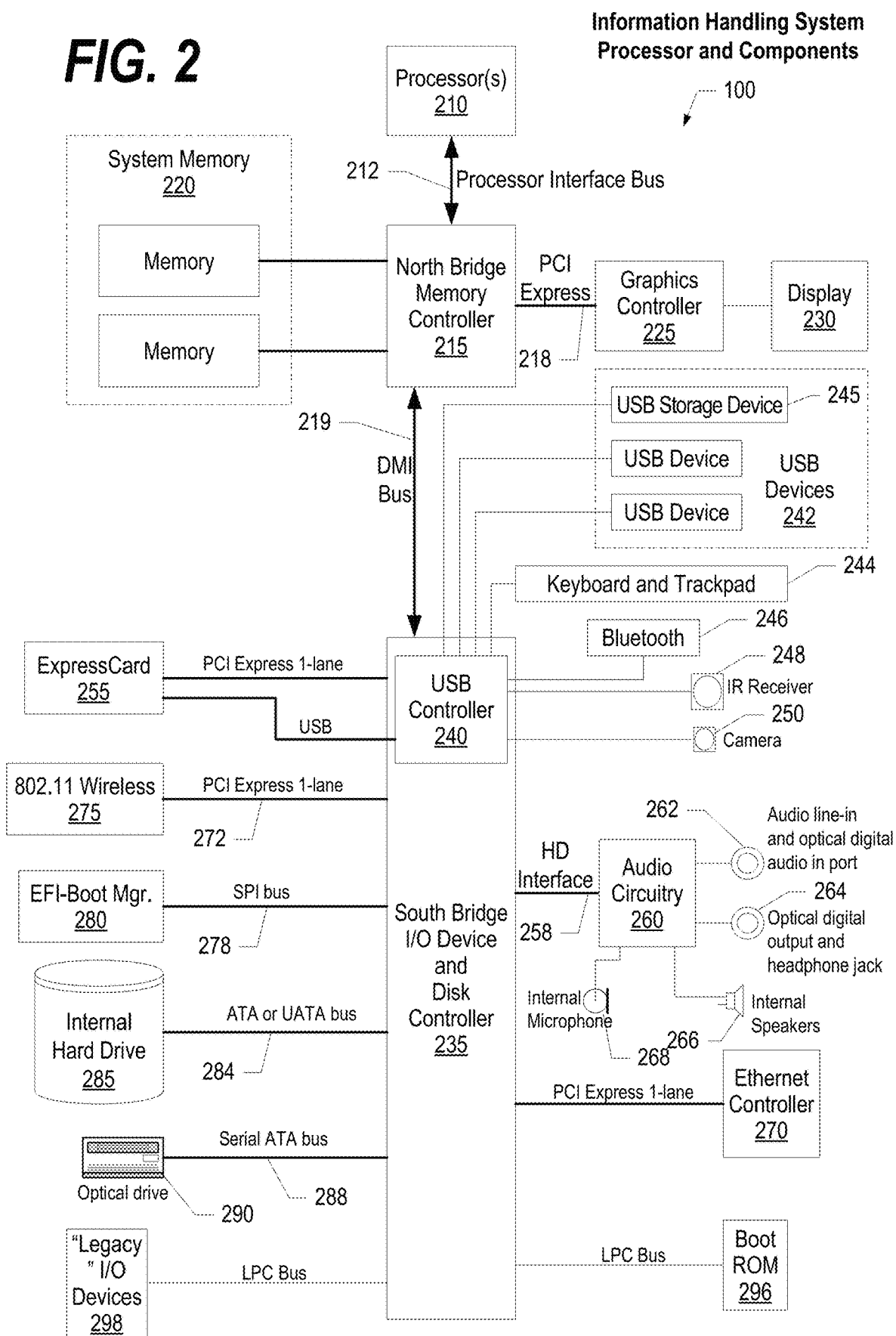
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
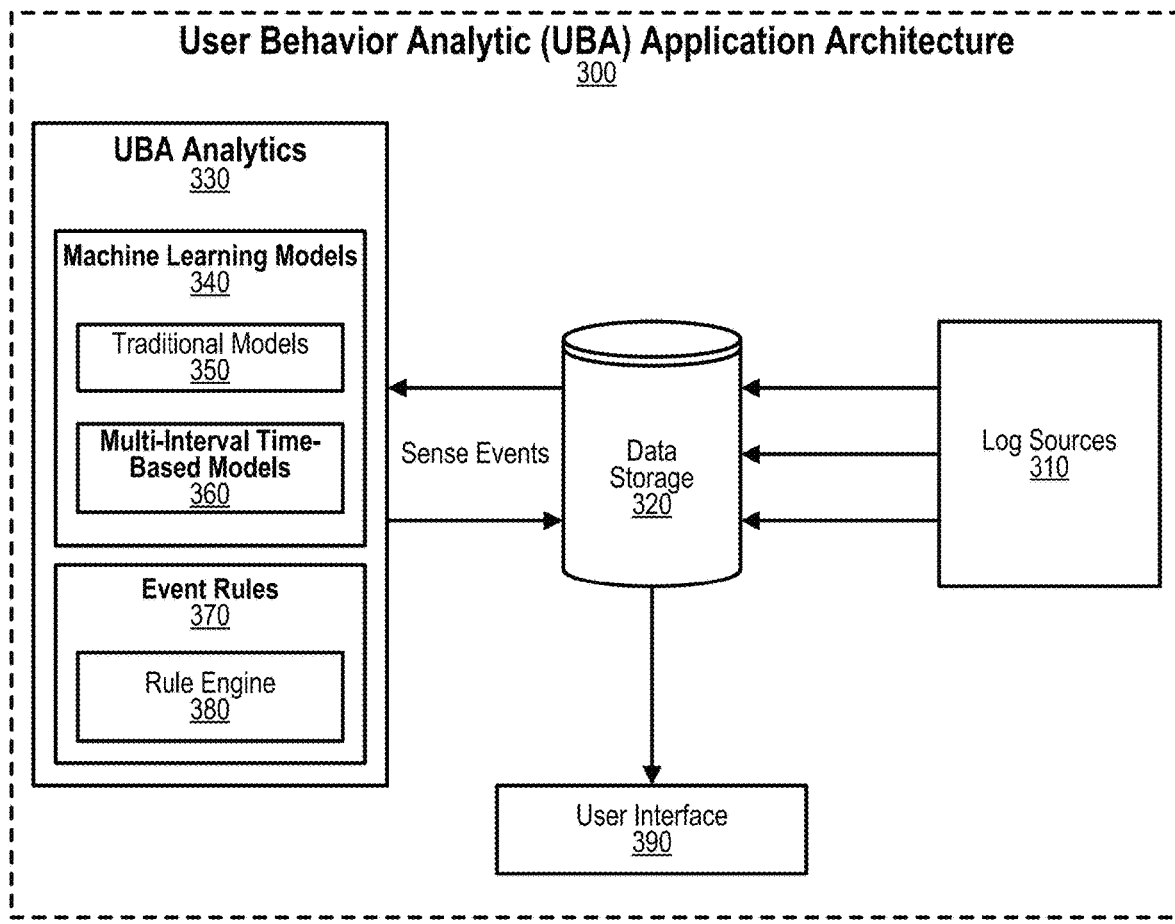
FIG. 3 is a component diagram that shows the various components included in an architecture that provides a user behavior risk analytic application using multiple time intervals.

FIG. 3 is a component diagram that shows the various components included in an architecture that provides a user behavior risk analytic application using multiple time intervals. In the enhanced User Behavior Analytic (UBA) system, the raw events from log sources 310, such as the Security Information and Event Management System (SIEM), are analyzed with a spectrum of analytics ranging from simple pattern matches, complex rule-based analytics, to machine language (ML) models, as shown in FIG. 3. A rule or a set of rules tests the incoming raw events to detect unusual activities associated with a user. The ML modeling is achieved in a separate, multi-algorithm/analytic pipeline engine where unified analytics engine framework is deployed. The event data received from log sources 310 are stored in data store 310.

UBA assigns a risk score to a user based on detected risks from ML as well as the rule engine of the SIEM. This score is dynamic in nature. With each detected risky or suspicious behavior by the rule engine or by the Machine Learning modeling, the risk score for a user is increased promoting the risk ranking of that user among the monitored users. For example, if a user accessed an external resource that is deemed to be an inappropriate, risky, or having signs of infection, then the rule "User Accessing Risky Resources" is triggered to generate a sense event with a preconfigured risk score attached. Another example with using the rules engine is the rule "User Geography Change," where data matches this rule, it would indicate that a user logged in remotely from a country that is different from the country of the user's last remote login, indicating a potential account compromise. The score associated with each rule can be customized in the system. On the other hand, the Machine Learning modeling system uses various algorithms to 'learn' a base model with users' past behaviors, then 'score' their current behavior when it deviates from the learned behavior. For example, the "Learned Peer Group" model Identifies users who engage in similar activities and then places them into peer groups. If a user's current peer group is significantly different from the model's predictions, then a sense event is generated to increase that user's risk score. As with rule-based sense score, the Machine Learning sense score value is also configurable and can be customized based an organization's environment.

UBA Analytics 330 depicts the models and rules used to analyze the event data. UBA analytics include both machine learning (ML) models 340 as well as event rules 370 with the event rules being performed by rule engine 380. The machine learning models include both traditional models 350 as well as multi-interval time-based models 360. The multi-interval time based models are more fully described in FIGS. 4-10 and associated descriptions.

Figure 4:
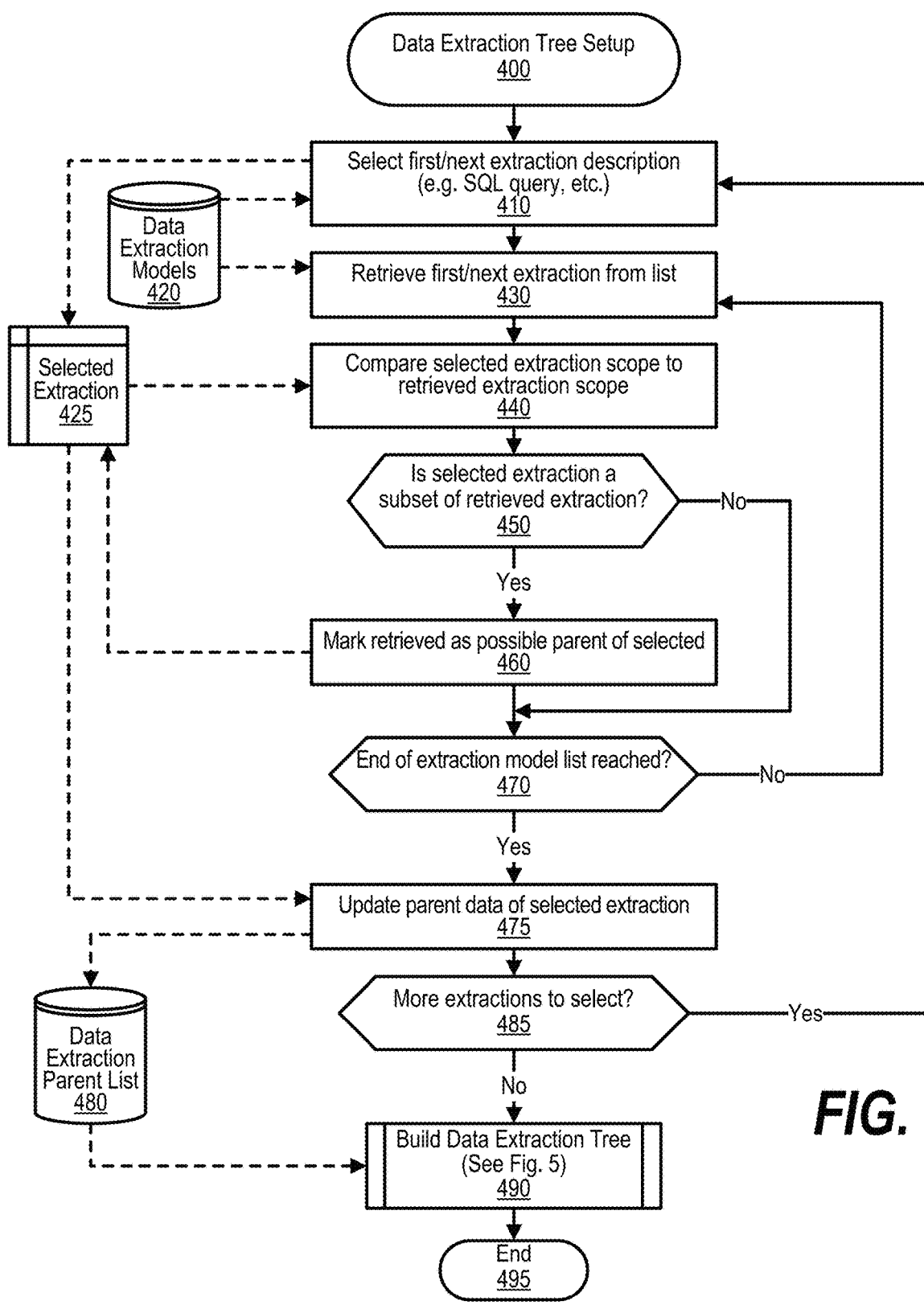
FIG. 4 is a depiction of a flowchart showing the logic used to setup a data extraction tree.

FIG. 4 is a depiction of a flowchart showing the logic used to setup a data extraction tree. FIG. 4 processing commences at 400 and shows the steps taken by a process that sets up a data extraction tree of datasets and subset datasets that are used to provide input data to the various models. At step 410, the process selects the first extraction description from data store 420. An example of an extraction description is a database (SQL) query or other description of data. The selected extraction scope is stored in memory area 425. At step 430, the process retrieves the first extraction from the list of extractions found in data store 420.

At step 440, the process compares the selected extraction scope (from step 410) to the retrieved extraction scope (from step 430). The process determines as to whether the selected extraction scope is a subset of the retrieved extraction scope (decision 450). If the selected extraction scope is a subset of the retrieved extraction scope, then decision 450 branches to the 'yes' branch whereupon, at step 460, the process marks the retrieved extraction scope as a possible parent of the selected extraction scope with this data being retained in memory area 425. On the other hand, if the selected extraction scope is not a subset of the retrieved extraction scope, then decision 450 branches to the 'no' branch bypassing step 460.

The process determines whether the end of the extraction model list has been reached for the retrieved extractions (decision 470). If the end of the extraction model list has not yet been reached, then decision 470 branches to the 'no' branch which loops back to step 430 to retrieve and compare the next extraction scope to the selected extraction scope. This looping continues until there are no more extraction scopes to retrieve from data store 420, at which point decision 470 branches to the 'yes' branch exiting the loop. At step 475, the process updates the parent data of the selected extraction by recording the possible parent extraction scopes found for the selected extraction. These updates are written to data store 480 and associated with the selected extraction description.

The process next determines whether there are more extractions to select and process as described above by comparing the selected extraction descriptions to the other extraction descriptions found in data store 420 (decision 485). If there are more extraction descriptions to select, then decision 485 branches to the 'yes' branch which loops back to step 410 to select and process the next extraction description. This looping continues until all of the extraction descriptions have been processed, at which point decision 485 branches to the 'no' branch exiting the loop. At predefined process 490, the process performs the Build Data Extraction Tree routine (see FIG. 5 and corresponding text for processing details). FIG. 4 processing thereafter ends at 495.

Figure 5:
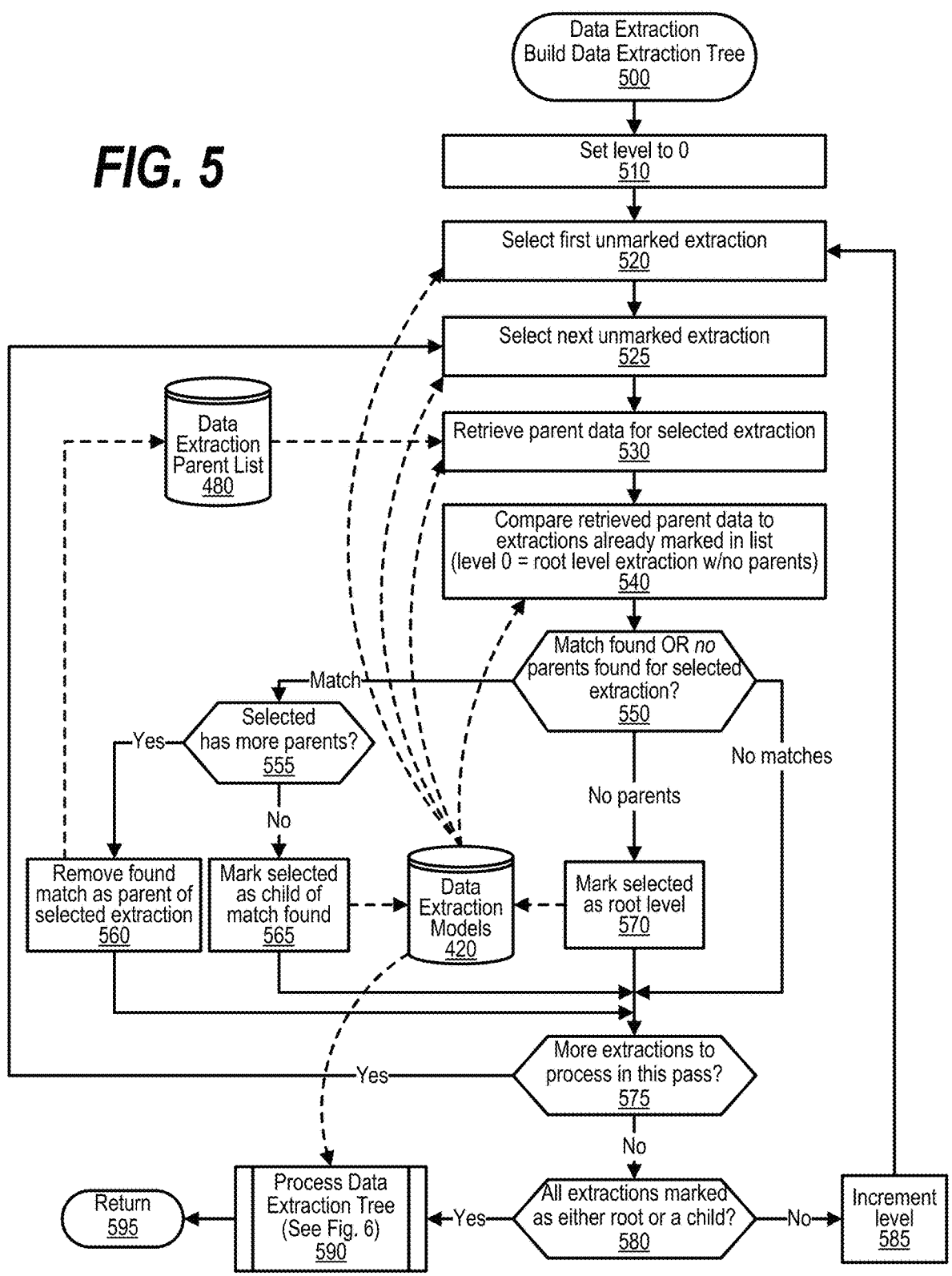
FIG. 5 is a depiction of a flowchart showing the logic used to build a data extraction tree using data gathered by the processing shown in FIG. 4.

FIG. 5 is a depiction of a flowchart showing the logic used to build a data extraction tree using data gathered by the processing shown in FIG. 4. FIG. 5 processing commences at 500 and shows the steps taken by a process that builds the data extraction tree by using the parent data collected by the process shown in FIG. 4. At step 510, the process initializes, or sets, the current level to zero. At step 520, the process selects the first unmarked extraction from the data extraction models that are stored in data store 420. At step 525, the process selects the next unmarked extraction to use as a comparison. Again, the unmarked extractions are retrieved from data store 420. At step 530, the process retrieves the parent data for the selected extraction with the parent data previously being stored in data store 480 by the process shown in FIG. 4.

At step 540, the process compares the retrieved parent data of the selected extraction to the extractions that have already been marked in list stored in data store 420. A level zero extraction indicates that the extraction is a root level extraction with no other parents, such as the main dataset. The process determines as to whether a match found by the comparison or whether no parents were found for the selected extraction (decision 550). If a match was found by the comparison, then decision 550 branches to the 'match' branch to perform steps 555 through 565. If no parents were found for the selected extraction, then decision 555 branches to the 'no parents' branch to perform step 570. Finally, if no matches were found, then decision 550 branches to the 'no matches' branch bypassing steps 555 through 570.

If a match was found by the comparison, then steps 555 through 565 are performed. The process first determines whether the selected extraction has more possible parent extractions or only a single parent extraction (decision 555). If the selected extraction has more possible parent extraction, then decision 555 branches to the 'yes' branch whereupon, at step 560, the process removes the found match as a possible parent in data store 480 as the goal is to find a parent extraction that is closer in scope to the selected extraction. If the selected extraction has only this parent extraction left in data store 480, then decision 555 branches to the 'no' branch whereupon, at step 565, the process marks the selected extraction as a child extraction of the matched extraction that was found. This parent-child relationship is marked, or stored, in data store 420.

Returning to decision 550, if no parents were found for the selected extraction, then decision 555 branches to the 'no parents' branch to perform step 570. At step 570, the process marks the selected extraction as a root level extraction (e.g., the extraction uses the main dataset for processing to provide data to the associated model, etc.).

After the comparison has been processed, the process next determines whether there are more extractions to process in this pass through the data extraction models (decision 575). If there are more extractions to process in this pass, then decision 575 branches to the 'yes' branch which loops back to step 525 to select the next unmarked extraction from data store 420. This looping continues until all unmarked extractions have been processed, at which point decision 575 branches to the 'no' branch exiting the loop.

The process next determines as to whether all of the extractions have now been marked as either a root level extraction or a child extraction of another (parent) extraction (decision 580). If all extractions have not yet been marked as either a root extraction or a child extraction, then decision 580 branches to the 'no' branch whereupon, at step 585, the process increments the level (e.g., from zero to one, etc.) and loops back to step 520 to select the first unmarked extraction found in data store 420.

This looping continues until all of the extractions found in data store 420 have been marked as either a root level extraction or a child extraction, at which point decision 580 branches to the 'yes' branch to perform predefined process 590. At predefined process 590, the process performs the process data extraction tree routine (see FIG. 6 and corresponding text for processing details). FIG. 5 processing thereafter returns to the calling routine (see FIG. 4) at 595.

Figure 6:
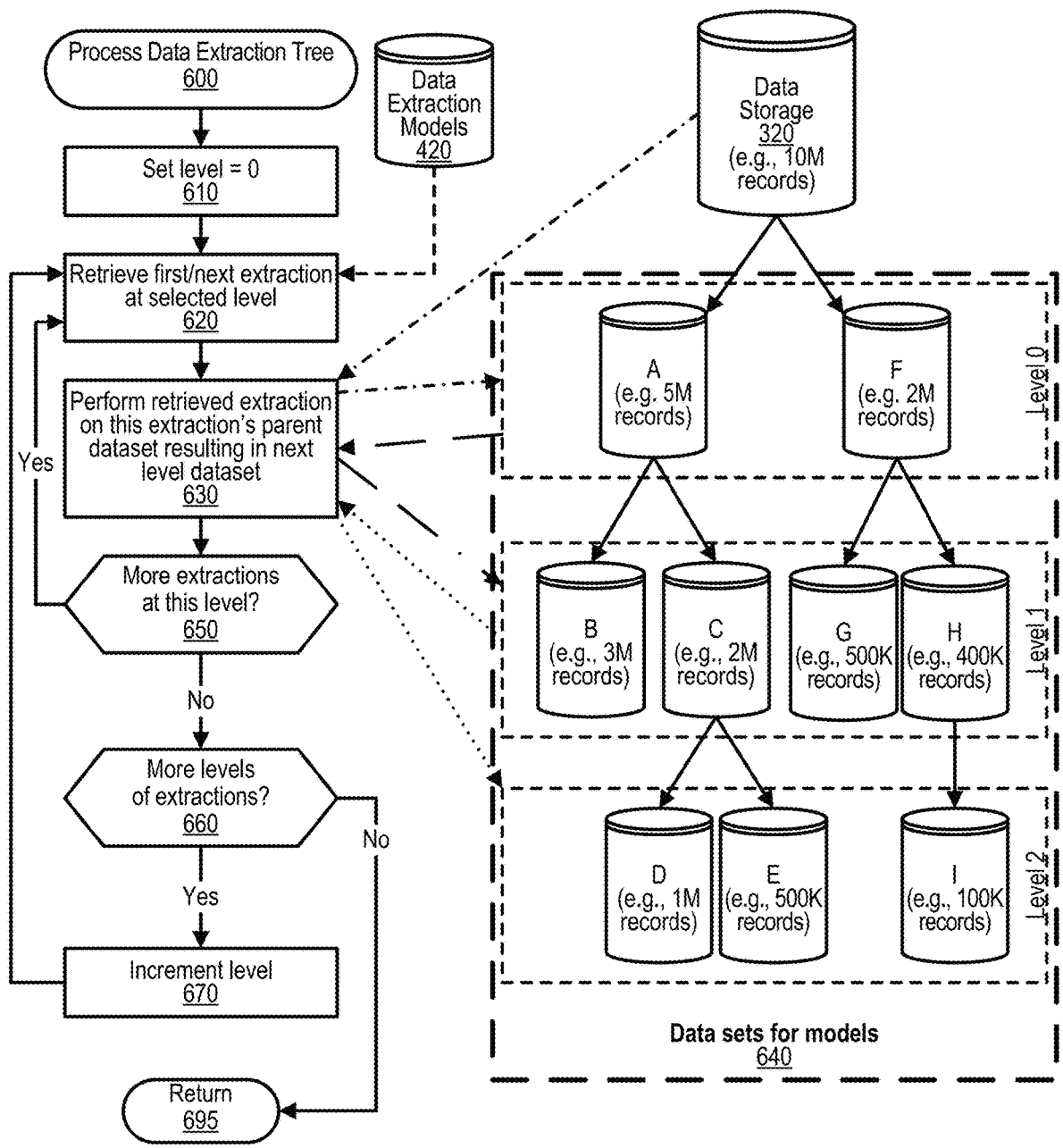
FIG. 6 is a depiction of a flowchart showing the logic used to perform data extractions using the data extraction tree that was built in FIG. 5.

FIG. 6 is a depiction of a flowchart showing the logic used to perform data extractions using the data extraction tree that was built in FIG. 5. FIG. 6 processing commences at 600 and shows the steps taken by a process that processes a data extraction tree to create subset datasets. At step 610, the process initializes, or sets, the current level to zero. Level zero datasets are those datasets that were found to not have a parent dataset other than the main dataset (data store 320) from which to extract data. In the example shown in block 640, the level zero data sets are noted as the 'A' dataset and the 'F' dataset that are both created by executing extractions (e.g., SQL queries, etc.) against main dataset 320.

At step 620, the process retrieves the first extraction at the selected level, such as the extractions to perform for the 'A' subset dataset. The extractions were identified by the processing shown in FIGS. 4 and 5 where they were stored in data store 420 from which the extractions are retrieved at step 620. At step 630, the process performs retrieved extraction on this extraction's parent dataset resulting in a next level dataset created at the current level (e.g. level zero, one, etc.). The process determines as to whether there are more extractions to perform at this level, such as the extraction to create subset dataset 'F' (decision 650). If there are more extractions to perform at this level, then decision 650 branches to the 'yes' branch which loops back to step 620 to retrieve and perform the next extraction at the current level. This looping continues until all of the extractions have been performed for the current level, at which point decision 650 branches to the 'no' branch exiting the loop.

The process next determines as to whether there are more levels of extractions to perform (decision 660). In the example shown, there are three levels of extractions (zero, one, and two). If there are more levels of extractions to perform, then decision 660 branches to the 'yes' branch whereupon, at step 670, the process increments the current level (e.g., from zero to one, etc.) and then loops back to retrieve the first extraction at this newly set extraction level. This looping continues until all of the levels of extraction have been performed, at which point decision 660 branches to the 'no' branch exiting the loop and processing returns to the calling routine (see FIG. 5) at 695.

Figure 7:
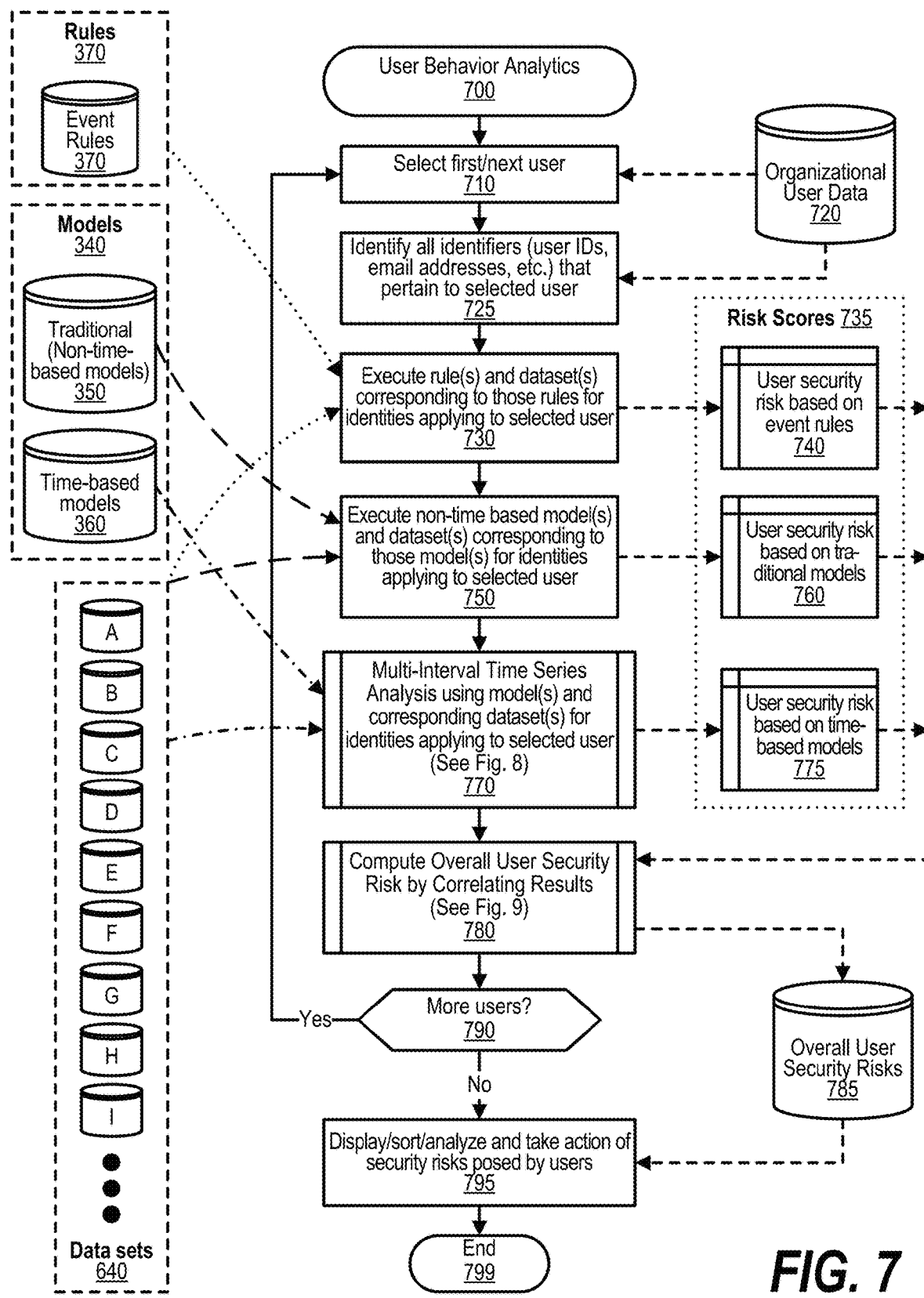
FIG. 7 is a depiction of a flowchart showing the logic used to perform the user behavior analytics using the extracted data.

FIG. 7 is a depiction of a flowchart showing the logic used to perform the user behavior analytics using the extracted data. FIG. 7 processing commences at 700 and shows the steps taken by a process that processes user behavior analytics to create risk scores associated with the users. At step 710, the process selects the first user from data store 720 with data store 720 having a list of the users in the organization that are being processed. At step 725, the process identifies all of the identifiers (e.g., user identifiers, email addresses, login identifiers, etc.) that pertain to the selected user. The user name contained in a raw security event may be of different forms due to diverse event sources. For example, a user identifier can be an email address in one log event, but a server account name in another event for the same user. This leads to risk score dilution as the same user is split into two or more users in the system. To address this issue, in one embodiment the system integrates an external registry such as a LDAP client that can be configured to fetch the organizational directory information from its LDAP server if available. When this is properly configured the system automatically identifies user identities in multiple sense events as one or more 'aliases' of the same user and coalesces their sense score for that user. User data from external LDAP severs are extracted periodically and stored/used in a map data structure where one user key is mapped to one or more alias identifiers. The identifiers belonging to the same user can then be detected, if present, in multiple sense events.

At step 730, the process executes one or more rules using datasets that correspond to those rules for the identities that apply to the selected user. The dataset might be a main dataset of a subset dataset that was created by the processing shown in FIGS. 4-6 with datasets 640 being created to correspond to the various rules and models that are being used by the organization to identify risky behavior of users. Rule based analytics are based on specific type of events, or a sequence of typed events, therefore they are not processed by machine learning. For example, a User Geography Change rule could be an analytic where a user logged in remotely from a country that is different from the country of the user's last remote login. This rule might also indicate an account compromise, particularly if the rule matches occurred closely in time. Event rules 370 are read at step 730 and executed with an example of an event rule being an algorithm. The results of processing the datasets with the event rules are stored as part of risk scores 735, with the event rules results being stored in memory area 740.

At step 750, the process executes non-time based models 350 using corresponding datasets from dataset storage 640. The results of the non-time based models are stored in memory area 760 which is one of the memories included in risk scores 735. Examples of 'non-time based' models include peer grouping analytics where all of the user's data is compared to the data of other users, in a clustering algorithm where the behavioral group predictions are made and the anomaly would be large deviation from the learned grouping affiliation.

Figure 8:
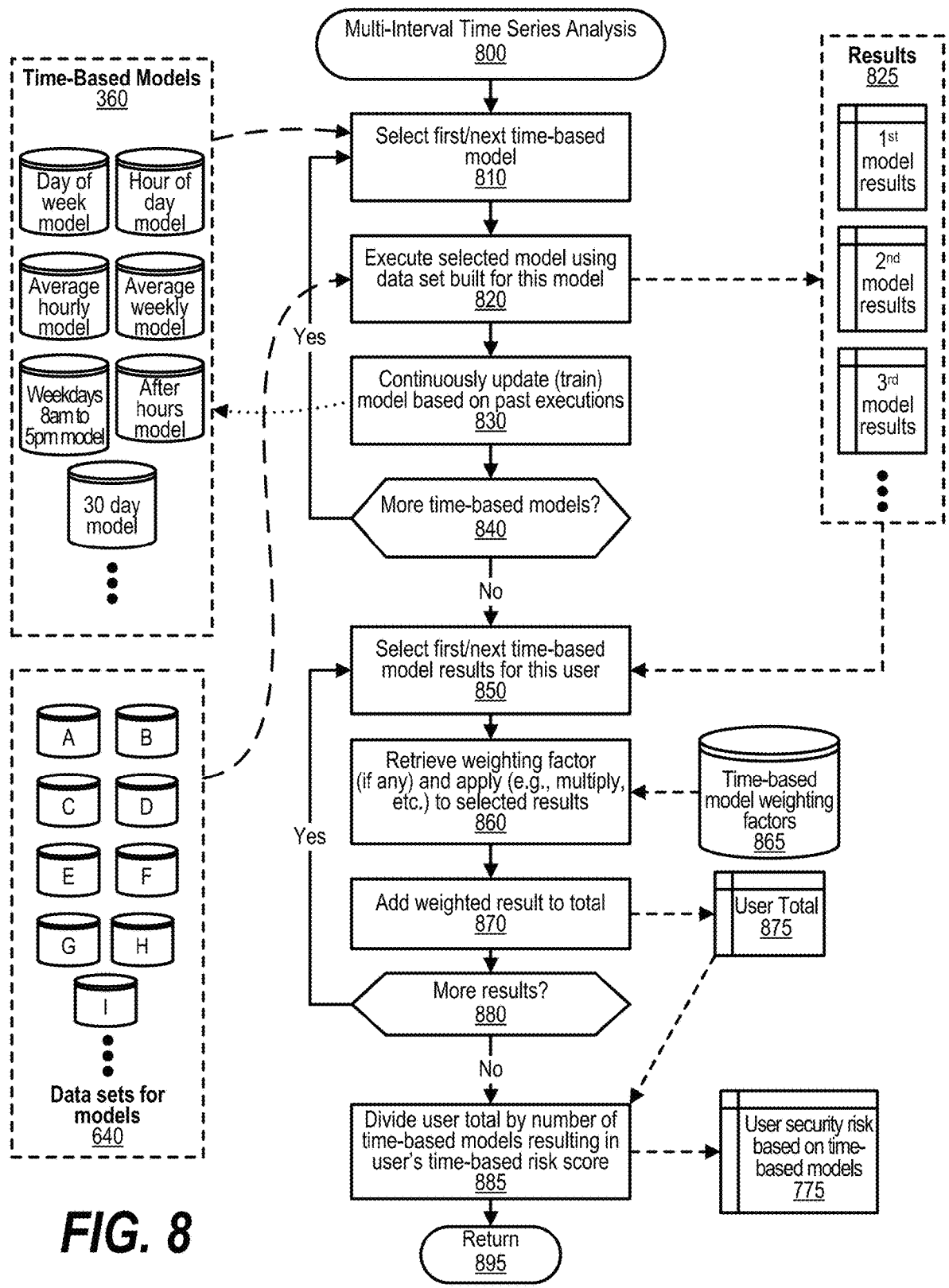
FIG. 8 is a depiction of a flowchart showing the logic used to perform a multi-interval time series risk analysis for a selected user.

At predefined process 770, the process performs the Multi-Interval Time Series Analysis routine using time-based models and corresponding subset datasets for the identities that apply to the selected user (see FIG. 8 and corresponding text for processing details). The time-based models that are performed are retrieved from data store 360 and the results of the time-based models are stored in memory area 775 which is also one of the memories included in risk scores 735.

Figure 9:
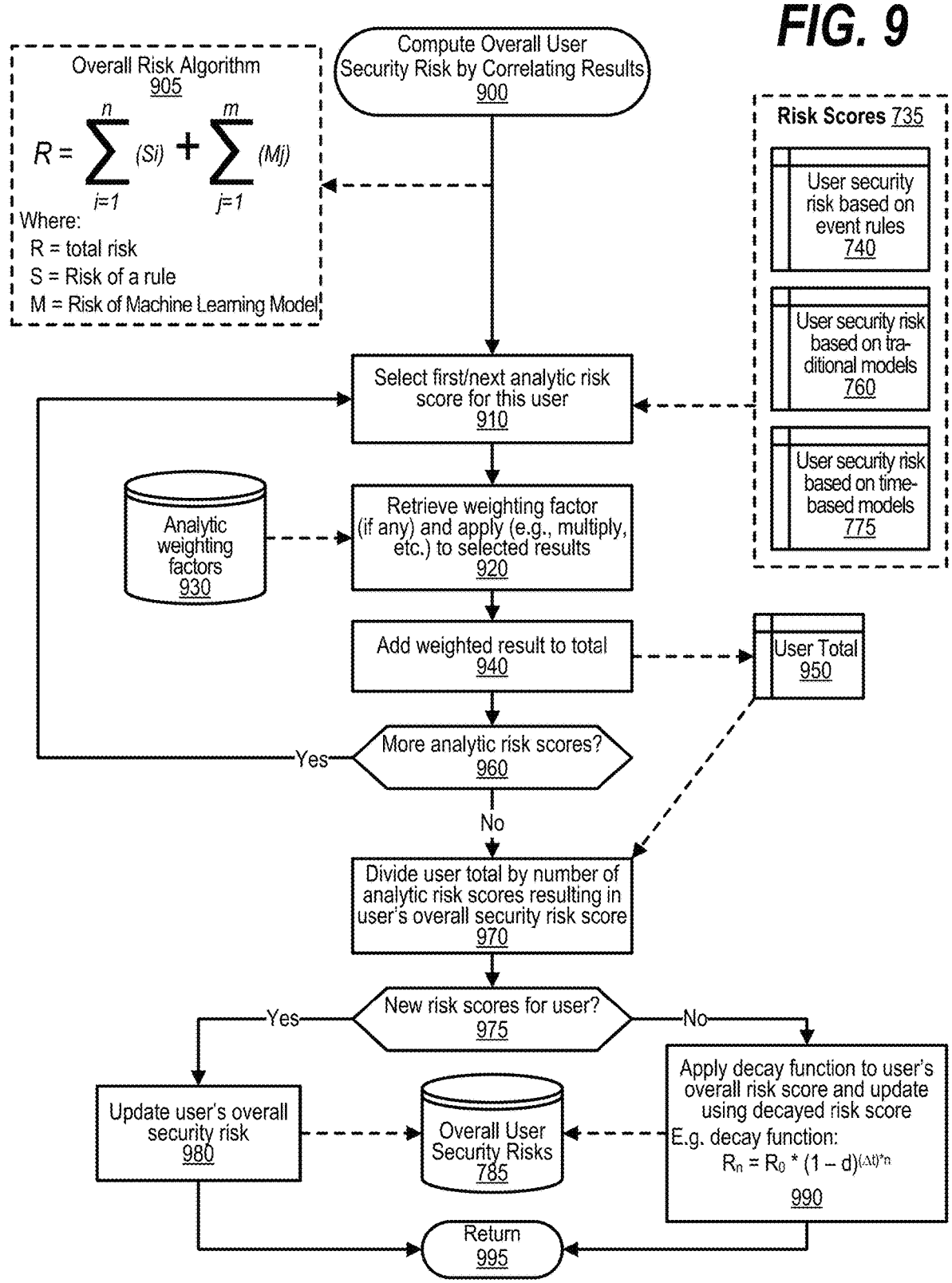
FIG. 9 is a depiction of a flowchart showing the logic used to compute a user's overall security risk by correlating results.

At predefined process 780, the process performs the Compute Overall User Security Risk by Correlating Results routine (see FIG. 9 and corresponding text for processing details). This routine combines the risk scores stored in 735 to create overall risk scores pertaining to users with the overall risk scores being stored in data store 785.

The process determines as to whether there are more users to select and process as described above (decision 790). If there are more users to select and process, then decision 790 branches to the 'yes' branch which loops back to step 710 to select the next user from data store 720. This looping continues until all of the users have been processed, at which point decision 790 branches to the 'no' branch exiting the loop. At step 795, the process performs an action, such as a security action, based on the overall security risks determined for the various users in the organization. The action can include displaying the users based on overall risk scores, further analyzing the users and the risk scores, including users with high risk scores on a risk report for further inquiry and analysis, and many other risk aversion processes. FIG. 7 processing thereafter ends at 799.

FIG. 8 is a depiction of a flowchart showing the logic used to perform a multi-interval time series risk analysis for a selected user. FIG. 8 processing commences at 800 and shows the steps taken by a process that performs a multi-interval time series analysis on the user based on the event data gathered for the user. At step 810, the process selects the first time-based model from data stores 360. At step 820, the process executes the selected model using the dataset that was built for this model with the dataset being retrieved from data stores 640. The results from the models are retained in memory areas 825, with the process recording a different risk score (result) pertaining to each of the time-based models.

At step 830, the process continuously updates, or "trains," the time-based model based on past executions of the model. In this manner, time-based models 360 are dynamically and continuously updated rather than being static, unchanged models that are not updated after initial training. The process determines as to whether there are more time-based models to select and execute (decision 840). If there are more time-based models to select and execute, then decision 840 branches to the 'yes' branch which loops back to step 810 to select and execute the next time-based model. This looping continues until all of the time-based models have been executed for this user with results from the various models stored in memory areas 825, at which point decision 840 branches to the 'no' branch exiting the loop.

At step 850, the process selects the first time-based model results for this user from memory areas 825. In one embodiment, weighting factors are used so that results from some time-based models are enhanced because of the organization's preferences or because empirical evidence shows that such time-based models are better indicators of risky user behavior than other time-based models. At step 860, the process retrieves any such weighting factor from data store 865 and, if one exists, applies it to the selected time-based model result (e.g., multiply the score from the time-based model by the weighting factor, etc.) to calculate a weighted score (results) from the time-based model.

At step 870, the process adds the weighted score from the selected time-based model to the user's risk score total with the risk score total being stored in memory area 875. The process determines whether there are more time-based model results, or scores, stored in results memory areas 825 (decision 880). If there are more time-based model results, then decision 880 branches to the 'yes' branch which loops back to step 850 to select and process the next time-based model result (score) as described above. This looping continues until all of the time-based model results have been processed, at which point decision 880 branches to the 'no' branch exiting the loop.

In one embodiment, as depicted at step 885, the process divides the user total stored in memory area 875 by the number of time-based models resulting in user's time-based risk score. This time-based risk score of the user is stored in memory area 775. FIG. 8 processing thereafter returns to the calling routine (see FIG. 7) at 895.

FIG. 9 is a depiction of a flowchart showing the logic used to compute a user's overall security risk by correlating results. FIG. 9 processing commences at 900 and shows the steps taken by a process that computes the user's overall security risk score by correlating various risk-based results, such as risk scores from event rules, from non-time-based models, and from time-based models. The overall security risk can be expressed as an algorithm, such as algorithm 905. At step 910, the process selects the first analytic risk score for this user from risk scores memory areas 735 with these memory areas including an event rules risk score stored in memory area 740, a non-based (traditional) model risk score stored in memory area 760, and a multi-interval risk score based on time-based machine learning models stored in memory area 775.

In one embodiment, each of the risk scores stored in memory areas 740, 760, and 775 can be weighted to emphasize some types of risk scores more than other types of risk scores For example, the organization may deem the time-based risk score to be more important and, therefore, apply a weight to the time-based risk score that is greater than weights applied to the other scores. In this embodiment, at step 920, the process retrieves the weighting factor (if any) for the selected analytic risk score for the user and applies the weighting factor (e.g., by multiplying the selected risk score by the retrieved weighting factor, etc.). At step 940, the process adds the weighted result (score) to the user's total with the user's total being stored in memory area 950.

The process determines as to whether there are more analytic risk scores to select and process as described above (decision 960). If there are more analytic risk scores, then decision 960 branches to the 'yes' branch which loops back to step 910 to select the next analytic risk score and process it as described above. This looping continues until all of the analytic risk scores have been selected and processed, at which point decision 960 branches to the 'no' branch exiting the loop.

In one embodiment, depicted at step 970, the process divides the user's total risk score by the number of analytic risk scores that were processed with the calculation resulting in the user's overall security risk score. In one embodiment, the process further determines whether new risk scores have been generated for the user from the processing of new event data that pertains to the user (decision 975). If new risk scores have been generated for the user, then decision 975 branches to the 'yes' branch whereupon, at step 980, the process updates user's overall security risk with the updated information being written to data store 785.

On the other hand, if there are not new risk scores for user indicating that the risk data is somewhat stale for the user, then decision 975 branches to the 'no' branch whereupon, at step 990, the process applies a decay function to the user's overall risk score and updates the user's overall security risk with the decayed risk score. While a user's risk ranking is increased by these first order and/or second order alerts (event data), the user's risk score is not stalled at its achieved value when there is no continuous risky activity in any given period of time. Therefore, an exponential decay function is used to decay the risk value with time in a discrete manner, as described below. This will further highlight the users with current risky activity compare to relatively inactive users.

Assume no new risk score is added to a user or entity, then the overall decay of the risk score as a discrete function of time may be expressed as:

$$R_n = R_0 * (1-d)^{(\Delta t)*n}$$

Where $R_0$ is the initial risk score, d is configurable decay parameter, n is number of runs of the decay function, $\Delta t$ denotes the time duration between two subsequent runs, and $R_n$ is the reduced risk score. FIG. 9 processing thereafter returns to the calling routine (see FIG. 7) at 995.

Figure 10:
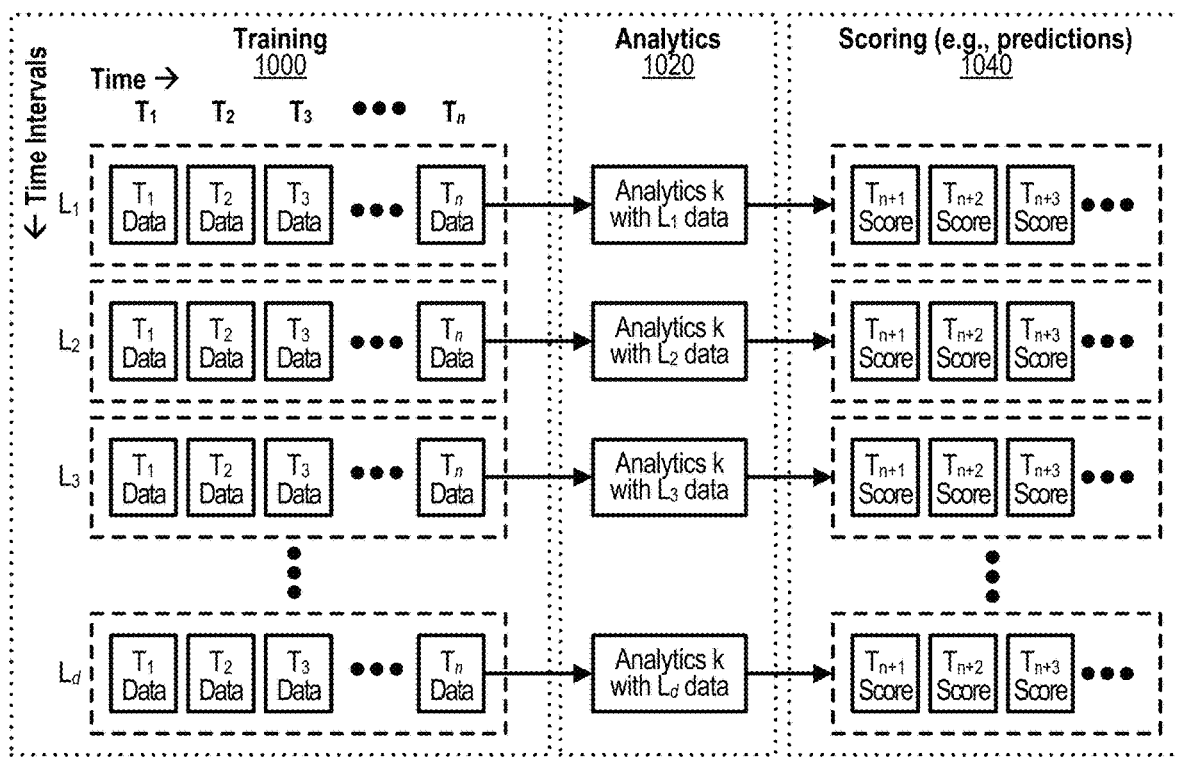
FIG. 10 is a depiction of time series analytics in a User Behavior Analytic (UBA) application machine language pipeline.

FIG. 10 is a depiction of time series analytics in a User Behavior Analytic (UBA) application machine language (ML) pipeline. The ML pipeline system consists of multiple use cases. Each use case may use a different machine learning algorithm. The training data for each use case can be time series data with characteristics of certain user activity or groups of activities. The model building and scoring for these use cases are executed independent of each other, and their training data do not have to be the same. For example, a use case could be to track a user's general activity by time and create a model for the predicted behavior patterns in an hourly time series. If the user's activity deviates from the learned behavior, it is deemed suspicious and an alert is generated. In the diagram, training is depicted at 1000 with each row (L1, L2, etc.) being data in subset datasets that applies to a different time-based model, with such time-based models being shown as analytics 1020. The result of inputting event data 1000 through analytics 1020 are scores 1040 that are predictions of the user's future behavior in terms of risk.

In one embodiment, the time series analytics 1020 take the time interval as a continuum variable that participates in the statistical assessment. However, user behaviors may be highly heterogeneous as regards to time. For example, the activities in each hour of the day differs from each other, and activities in each day of the week differs from each other (for example, weekends are expected to have low activity). Therefore analyzing the data on different, non-continuum time intervals are important. The following time-interval modeling schemes are provided as example models that might be used in the designed in the multi-interval time-based ML system. Each of these example time-based models would be represented as a different row (L1, L2, etc.) of data. Each of the time-based models has a different time interval, as described below.

Hour of Day Model: This is a scheme where 24 hourly-models, for 0 to 24 hours of a day are built with training data. When scoring, each hour of data is compared to it corresponding hourly model for anomaly detection.

Average Hourly Model: The time unit is also hourly as in 1) above, but the model collapses the 24 hours into an average hourly prediction. For example, at model building time the previous 30 days of hourly data for a user are used as training data for an average model. When scoring, each new hourly data is compared to the model prediction (in this case, just one average model).

Day of Week Model: The time unit is daily, and a statistic model is built for each day from Monday to Sunday using training data. When scoring, each past day's data is compared to the model prediction for that specific day of week for anomaly detection.

Average Weekly Model: The time unit is one week, and an overall weekly model is built with sufficient training data which are aggregated into weekly buckets. When scoring, each past week's aggregate value is compared to the weekly model for anomaly detection.

Other modeling schemes are possible with different time-interval selections, for example a model for weekend days, or a model for the day in a month, etc.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
    training a plurality of time-based machine-learning models using a first set of event data, wherein each one of the plurality of time-based machine-learning models is trained for a different one of a plurality of time intervals over which the first set of event data is taken, wherein the plurality of time intervals are not exclusive of each other, and wherein at least one of the time intervals is of a different time duration than another one of the time intervals;
    receiving a second set of event data, wherein each event in the second set of event data is a detected activity performed by a user over a time duration on one of a set of one or more computer systems;
    in response to receiving the second set of event data:
        calculating a plurality of time-based risk scores corresponding to the user, wherein the calculating comprises analyzing the second set of event data using the plurality of trained time-based machine-learning models, and wherein the analyzing is performed using a set of results received from the plurality of trained time-based machine-learning models;
        calculating one or more non-time-based risk scores corresponding to the user, wherein the non-time-based risk scores use one or more non-time based machine learning models;
        calculating one or more rule-based risk scores corresponding to the user, wherein the rule-based risk scores are calculated by a rules engine processing one or more non-machine-learned event rules;
        calculating a security risk score of the user, wherein the security risk score is calculated based on combining the plurality of time-based risk scores, the one or more non-time-based risk scores, and the one or more rule-based risk scores;
        determining that none of the plurality of time-based risk scores pertaining to the user are new time-based risk scores;
        in response to determining that none of the plurality of time-based risk scores pertaining to the user are new time-based risk scores, applying a decay function to the security risk score of the user, resulting in an updated security risk score for the user;
        performing an action based on the updated security risk score for the user; and
        automatically retraining the plurality of trained time-based machine-learning models using the second set of event data.

2. The method of claim 1 further comprising:
    correlating a set of machine-learning risk scores based on the set of results received from the plurality of trained time-based machine-learning models, wherein each set of machine-learning risk scores pertains to a modeled risk of the user corresponding to the respective time intervals of the time-based machine-learning models; and
    evaluating the correlated set of machine-learning risk scores to calculate the plurality of time-based risk scores pertaining to the user.

3. The method of claim 2 further comprising:
    utilizing an empirical distribution approach to perform the evaluating.

4. The method of claim 1 further comprising:
    storing the second set of event data in a main dataset;
    identifying one or more subset datasets, wherein each of the subset datasets pertain to a different one of the time-based machine-learning models; and
    forming the subset datasets from the main dataset, wherein the analyzing is performed by inputting each of the subset datasets to the respective subset datasets' time-based machine-learning model.

5. An information handling system comprising:
    one or more processors;
    a memory coupled to at least one of the processors; and
    a set of computer program instructions stored in the memory and executed by at least one of the processors in order to perform actions comprising:
        training a plurality of time-based machine-learning models using a first set of event data, wherein each one of the plurality of time-based machine-learning models is trained for a different one of a plurality of time intervals over which the first set of event data is taken, wherein the plurality of time intervals are not exclusive of each other, and wherein at least one of the time intervals is of a different time duration than another one of the time intervals;
        receiving a second set of event data, wherein each event in the second set of event data is a detected activity performed by a user over a time duration on one of a set of one or more computer systems;
        in response to receiving the second set of event data:
            calculating a plurality of time-based risk scores corresponding to the user, wherein the calculating comprises analyzing the second set of event data using the plurality of trained time-based machine-learning models, and wherein the analyzing is performed using a set of results received from the plurality of trained time-based machine-learning models;
            calculating one or more non-time-based risk scores corresponding to the user, wherein the non-time-based risk scores use one or more non-time based machine learning models;
            calculating one or more rule-based risk scores corresponding to the user, wherein the rule-based risk scores are calculated by a rules engine processing one or more non-machine-learned event rules;
            calculating a security risk score of the user, wherein the security risk score is calculated based on combining the plurality of time-based risk scores, the one or more non-time-based risk scores, and the one or more rule-based risk scores;
            determining that none of the plurality of time-based risk scores pertaining to the user are new time-based risk scores;
            in response to determining that none of the plurality of time-based risk scores pertaining to the user are new time-based risk scores, applying a decay function to the security risk score of the user, resulting in an updated security risk score for the user;
            performing an action based on the updated security risk score for the user; and
            automatically retraining the plurality of trained time-based machine-learning models using the second set of event data.

6. The information handling system of claim 5 wherein the actions further comprise:
    correlating a set of machine-learning risk scores based on the set of results received from the plurality of trained time-based machine-learning models, wherein each set of machine-learning risk scores pertains to a modeled risk of the user corresponding to the respective time intervals of the time-based machine-learning models; and evaluating the correlated set of machine-learning risk scores to calculate the plurality of time-based risk scores pertaining to the user.

7. The information handling system of claim 6 wherein the actions further comprise:
utilizing an empirical distribution approach to perform the evaluating.

8. The information handling system of claim 5 wherein the actions further comprise:
storing the second set of event data in a main dataset;
identifying one or more subset datasets, wherein each of the subset datasets pertain to a different one of the time-based machine-learning models; and
forming the subset datasets from the main dataset, wherein the analyzing is performed by inputting each of the subset datasets to the respective subset datasets' time-based machine-learning model.

9. A computer program product stored in a computer readable storage medium, comprising computer program code that, when executed by an information handling system, performs actions comprising:
training a plurality of time-based machine-learning models using a first set of event data, wherein each one of the plurality of time-based machine-learning models is trained for a different one of a plurality of time intervals over which the first set of event data is taken, wherein the plurality of time intervals are not exclusive of each other, and wherein at least one of the time intervals is of a different time duration than another one of the time intervals;
receiving a second set of event data, wherein each event in the second set of event data is a detected activity performed by a user over a time duration on one of a set of one or more computer systems;
in response to receiving the second set of event data:
calculating a plurality of time-based risk scores corresponding to the user, wherein the calculating comprises analyzing the second set of event data using the plurality of trained time-based machine-learning models, and wherein the analyzing is performed using a set of results received from the plurality of trained time-based machine-learning models;
calculating one or more non-time-based risk scores corresponding to the user, wherein the non-time-based risk scores use one or more non-time based machine learning models;
calculating one or more rule-based risk scores corresponding to the user, wherein the rule-based risk scores are calculated by a rules engine processing one or more non-machine-learned event rules;
calculating a security risk score of the user, wherein the security risk score is calculated based on combining the plurality of time-based risk scores, the one or more non-time-based risk scores, and the one or more rule-based risk scores;
determining that none of the plurality of time-based risk scores pertaining to the user are new time-based risk scores;
in response to determining that none of the plurality of time-based risk scores pertaining to the user are new time-based risk scores, applying a decay function to the security risk score of the user, resulting in an updated security risk score for the user;
performing an action based on the updated security risk score for the user; and
automatically retraining the plurality of trained time-based machine-learning models using the second set of event data.

10. The computer program product of claim 9 wherein the actions further comprise:
correlating a set of machine-learning risk scores based on the set of results received from the plurality of trained time-based machine-learning models, wherein each set of machine-learning risk scores pertains to a modeled risk of the user corresponding to the respective time intervals of the time-based machine-learning models; and
evaluating the correlated set of machine-learning risk scores to calculate the plurality of time-based risk scores pertaining to the user.

11. The computer program product of claim 10 wherein the actions further comprise:
utilizing an empirical distribution approach to perform the evaluating.

12. The computer program product of claim 9 wherein the actions further comprise:
storing the second set of event data in a main dataset;
identifying one or more subset datasets, wherein each of the subset datasets pertain to a different one of the time-based machine-learning models; and
forming the subset datasets from the main dataset, wherein the analyzing is performed by inputting each of the subset datasets to the respective subset datasets' time-based machine-learning model.

13. A method implemented by an information handling system that includes a processor and a memory accessible by the processor, the method comprising:
training a plurality of time-based machine-learning models using a first set of event data, wherein each one of the plurality of time-based machine-learning models is trained for a different one of a plurality of time intervals over which the first set of event data is taken, wherein the plurality of time intervals are not exclusive of each other, and wherein at least one of the time intervals is of a different time duration than another one of the time intervals;
receiving a second set of event data, wherein each event in the second set of event data is a detected activity performed by a user over a time duration on one of a set of one or more computer systems;
creating, from the second set of event data, a plurality of time-based datasets, wherein each of the time-based data sets corresponds to one of the plurality of trained time-based machine learning models, and wherein each one of the plurality of trained time-based machine learning models corresponds to a different one of the plurality of time intervals;
inputting the plurality of time-based datasets to their respective trained time-based machine learning models;
receiving, from the plurality of trained time-based machine learning models, a plurality of time-based risk scores, wherein each of the plurality of time-based risk scores corresponds to one of the plurality of trained time-based machine learning models;
calculating one or more non-time-based risk scores corresponding to the user, wherein the non-time-based risk scores use one or more non-time based machine learning models;

calculating one or more rule-based risk scores corresponding to the user, wherein the rule-based risk scores are calculated by a rules engine processing one or more non-machine-learned event rules;

calculating a security score of the user based on combining the plurality of time-based risk scores, the one or more non-time-based risk scores, and the one or more rule-based risk scores;

determining that none of the plurality of time-based risk scores pertaining to the user are new time-based risk scores;

in response to determining that none of the plurality of time-based risk scores pertaining to the user are new time-based risk scores, applying a decay function to the security score of the user, resulting in an updated security score for the user;

performing at least one security action, wherein the at least one security action is writing a user identifier of the user and the user's updated security score to a report; and automatically retraining the plurality of trained time-based machine-learning models using the second set of event data.

14. The method of claim 13 further comprising:

calculating a plurality of security scores, wherein each of the plurality of security scores corresponds to one of a plurality of users; and identifying one or more of the plurality of users with risky behavior based on the users' corresponding security scores.

15. An information handling system comprising:

one or more processors;

a memory coupled to at least one of the processors; and a set of computer program instructions stored in the memory and executed by at least one of the processors in order to perform actions comprising:

training a plurality of time-based machine-learning models using a first set of event data, wherein each one of the plurality of time-based machine-learning models is trained for a different one of a plurality of time intervals over which the first set of event data is taken, wherein the plurality of time intervals are not exclusive of each other, and wherein at least one of the time intervals is of a different time duration than another one of the time intervals;

receiving a second set of event data, wherein each event in the second set of event data is a detected activity performed by a user over a time duration on one of a set of one or more computer systems;

creating, from the second set of event data, a plurality of time-based datasets, wherein each of the time-based data sets corresponds to one of the plurality of trained time-based machine learning models, and wherein each one of the plurality of trained time-based machine learning models corresponds to a different one of the plurality of time intervals;

inputting the plurality of time-based datasets to their respective trained time-based machine learning models;

receiving, from the plurality of trained time-based machine learning models, a plurality of time-based risk scores, wherein each of the plurality of time-based risk scores corresponds to one of the plurality of trained time-based machine learning models;

calculating one or more non-time-based risk scores corresponding to the user, wherein the non-time-based risk scores use one or more non-time based machine learning models;

calculating one or more rule-based risk scores corresponding to the user, wherein the rule-based risk scores are calculated by a rules engine processing one or more non-machine-learned event rules;

calculating a security score of the user based on combining the plurality of time-based risk scores, the one or more non-time-based risk scores, and the one or more rule-based risk scores;

determining that none of the plurality of time-based risk scores pertaining to the user are new time-based risk scores;

in response to determining that none of the plurality of time-based risk scores pertaining to the user are new time-based risk scores, applying a decay function to the security score of the user, resulting in an updated security score for the user;

performing at least one security action, wherein the at least one security action is writing a user identifier of the user and the user's updated security score to a report; and automatically retraining the plurality of trained time-based machine-learning models using the second set of event data.

16. The information handling system of claim 15 wherein the actions further comprise:

calculating a plurality of security scores, wherein each of the plurality of security scores corresponds to one of a plurality of users; and identifying one or more of the plurality of users with risky behavior based on the users' corresponding security scores.

* * * * *